May 6, 1947. R. R. HARMON 2,420,242
GAS SCRUBBER
Filed Feb. 19, 1946 3 Sheets-Sheet 1

INVENTOR
ROBERT R. HARMON
BY
ATTORNEY

May 6, 1947. R. R. HARMON 2,420,242
GAS SCRUBBER
Filed Feb. 19, 1946 3 Sheets-Sheet 2
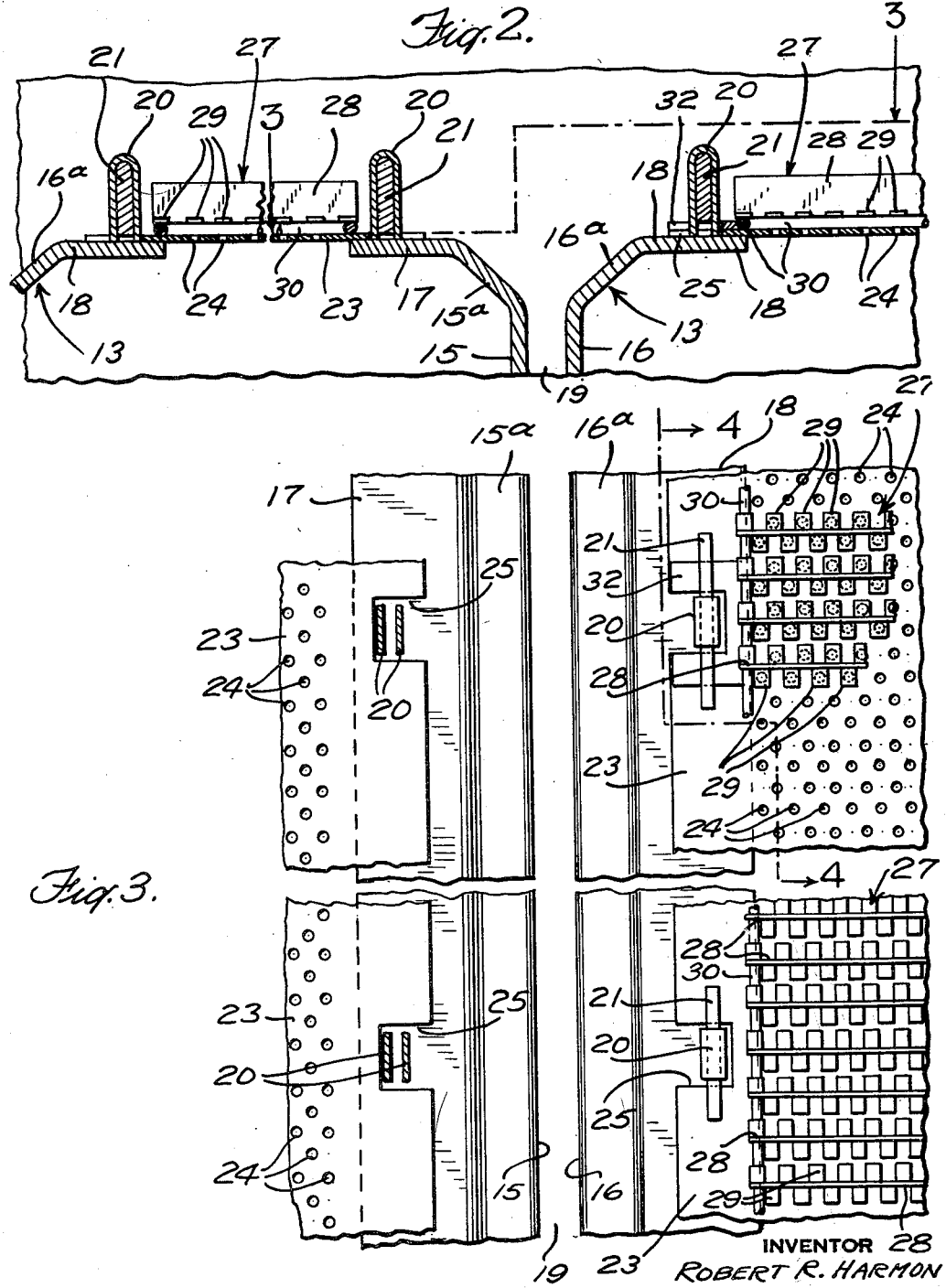
INVENTOR
ROBERT R. HARMON
BY
ATTORNEY May 6, 1947.  R. R. HARMON  2,420,242
GAS SCRUBBER
Filed Feb. 19, 1946  3 Sheets-Sheet 3
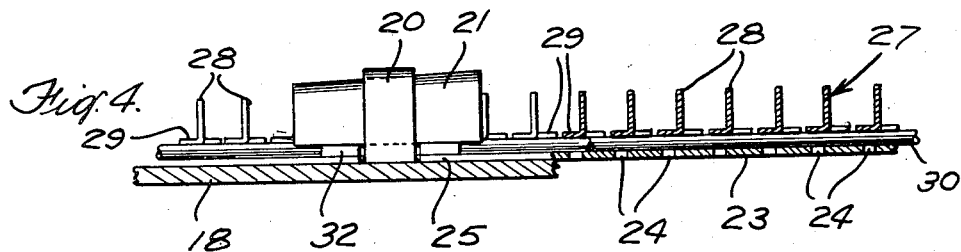
Fig. 4.
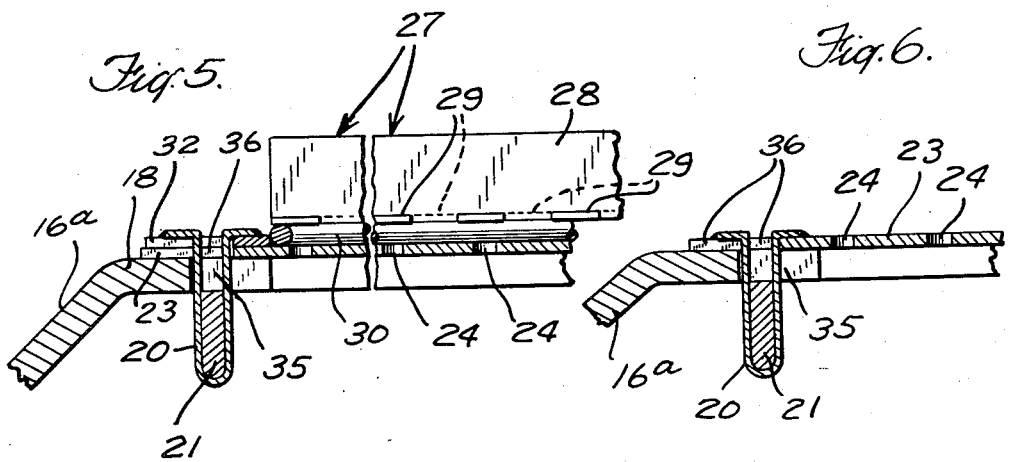
Fig. 5.   Fig. 6.
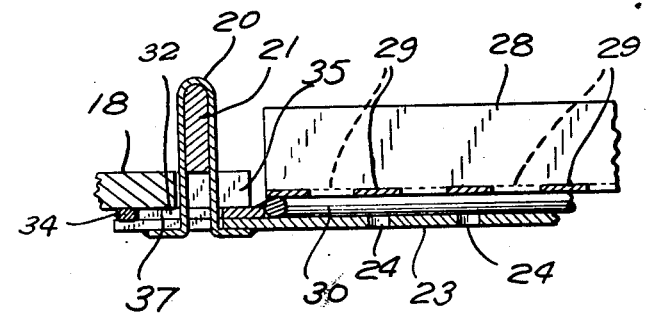
Fig. 7.
INVENTOR
ROBERT R. HARMON
BY
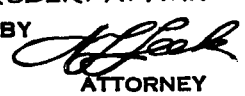
ATTORNEY Patented May 6, 1947

2,420,242

UNITED STATES PATENT OFFICE 2,420,242

GAS SCRUBBER

Robert R. Harmon, Charlottesville, Va., assignor to Peabody Engineering Corporation, New York, N. Y., a corporation of New York Application February 19, 1946, Serial No. 648,797

6 Claims. (Cl. 261—113)

This invention relates to gas and liquid contact apparatus of the type having one or more treating zones including perforated plates through which the gas passes upwardly at a velocity suited to prevent the liquid on said diaphragms from passing downwardly through said perforations. Such apparatus may be for cleaning gases, for cooling, or for liquid-gas contact purposes.

In one embodiment the apparatus embodies baffle grids above the perforated plates which assist in the removal of suspended particles and also increase the time of contact between the gas and liquid. An apparatus of this type suited for use as a scrubber is disclosed in my Patent No. 2,319,814, dated May 25, 1943.

It is an object of the present invention to provide a novel and improved diaphragm assembly for a gas and liquid contact apparatus of the above type.

Another object of the invention is to provide improved means for securing the perforated plates and baffle grids of the diaphragm assembly in an apparatus of the above type so as to simplify and expedite the installation and removal of the elements.

Another object is to clamp the perforated plate and baffle elements in the treating zone of a gas and liquid contact apparatus without the use of bolts or nuts which project to obstruct the spray and are frequently difficult to remove due to corrosion.

Another object is to provide an apparatus of the above type having novel and improved details of construction and mounting.

Various other objects and advantages will be apparent as the nature of the invention is more fully disclosed.

In one embodiment the invention is applied to a gas and liquid contact apparatus comprising a cylindrical upright casing containing one or more treating zones, as in my above mentioned Patent No. 2,319,814. Each such treating zone has a support consisting of an internal horizontal ledge carried by the cylindrical casing, a central imperforate diaphragm, and radial members which support said diaphragm and extend between the diaphragm and casing like the spokes of a wheel. The radial members have horizontal top flanges and are mounted with said flanges flush with the horizontal ledge and with the central diaphragm, and the perforated plates and baffle grids of the present invention are mounted on the flat horizontal supporting surfaces afforded by the flanges, the ledge and the central diaphragm.

In one of the embodiments hereinafter described, a plurality of loops or staples are secured to the above mentioned supporting surfaces, and segmental perforated plates having slots adjacent their marginal edges are seated on said supporting surfaces with the marginal slots of the plates straddling the staples. Tapered locking pins are driven into some, but not all, of the staples to clamp the perforated plates securely on the supports. For example, the locking pins may be inserted into alternate staples, while every other staple is left unoccupied. Superimposed upon each of the segmental perforated plates is a segmental baffle grid having outwardly extending slotted ears which straddle the alternate staples which were previously left unoccupied, and tapered locking pins are driven into these staples to firmly clamp the baffle grids, as well as the underlying perforated plates, to the support.

In other embodiments of the invention the staples, instead of being carried by the support, are mounted in staggered arrangement on the plate segments while the support is appropriately slotted to receive them. Furthermore, the plate segments may be secured to the under side of the support instead of to the upper surface thereof, as hereinafter more fully described.

The baffle grids of the present invention may comprise a plurality of spaced bars having lateral tabs projecting alternately from opposite sides thereof, so that said tabs together overlie all the perforations of the adjacent perforated plate, which perforations are preferably arranged in linear rows or files. The baffle grids have marginal spacer rods on the lower surface thereof, which secure the baffle bars together and also serve to space the baffle grids slightly from the underlying perforated plates when the elements are assembled in the manner above specified. As a result of the foregoing construction the ascending gases are prevented from leaking upwardly between the edges of the plate segments and their supporting surfaces, and are caused to flow through the perforations of the perforated plates and to be deflected by the overlying lateral tabs of the baffle grids.

The previous practice of using bolts and nuts to fasten down the plate segments in apparatus of the above type is objectionable because they may obstruct the liquid spray, and their use also involves considerable time-consuming labor. Furthermore, the corrosive action of the gases and liquids employed in such apparatus renders bolts and nuts difficult to remove and frequently they must be burned off when it is desired to remove the plates for cleaning or other purposes.

These difficulties of the prior art are overcome by the present invention which thus not only greatly improves the operating efficiency of the apparatus, but also effects considerable savings in installation and maintenance costs.

Although the novel features which are characteristic of this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

In the drawings:

Fig. 2 is an enlarged vertical section taken on the line 2—2 of Fig. 1;

Fig. 3 is a horizontal section taken on the line 3—3 of Fig. 2;

Fig. 4 is a detail sectional view taken on the line 4—4 of Fig. 3; and

Figs. 5, 6 and 7 are broken vertical sectional views illustrating different modifications of the invention.

Figure 1:
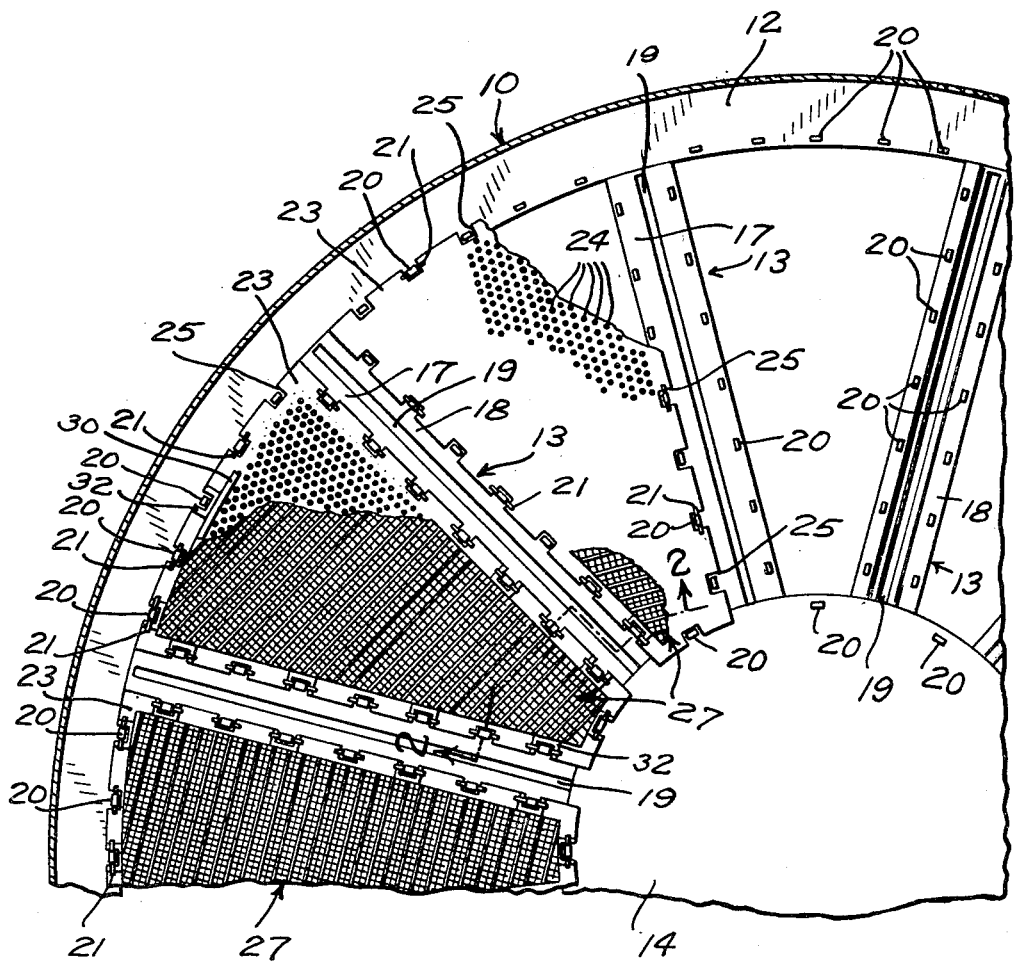
Fig. 1 is a sectional plan view of a gas scrubber diaphragm embodying the present invention, with the parts progressively broken away for the sake of clarity.

In the following description certain specific terms are used for convenience in referring to the various details of the invention. These terms, however, are to be interpreted as broadly as the state of the art will permit.

In the drawings, Fig. 1 illustrates the invention as applied to a gas scrubber comprising an upright cylindrical housing or casing 10. An annular horizontal ledge 12 is attached to the inner wall of the casing 10 by convenient means such as welding.

A plurality of radial members 13 are disposed in casing 10 like the spokes of a wheel, with the outer end of each such member 13 secured to the casing 10 and the inner end thereof secured to a central imperforate plate or diaphragm 14. Each radial member 13 comprises a pair of side plates 15 and 16, flared outwardly at their upper ends as at 15a and 16a, and having top horizontal flanges 17 and 18, respectively. The side plate 15 has a bottom horizontal flange formed to provide a trough 19 into which the side plate 16 extends to form a liquid seal, for further details of which reference may be had to my prior Patent No. 2,319,814.

The radial members 13 are assembled so that the top surfaces of the horizontal flanges 17 and 18 thereof are flush with the top surfaces of the horizontal ledge 12 and the central diaphragm 14.

In accordance with the present invention, a plurality of staples or loops 20 are secured to the top surfaces of each of the horizontal flanges 17 and 18, and to the horizontal ledge 12 and central diaphragm 14, as shown in Fig. 1. In the embodiment illustrated, the staples 20 on flanges 17 and 18 are spaced equally in linear rows; while the staples 20 on ledge 12 are spaced equally in arcuate rows adjacent the inner periphery of the ledge; and on the central diaphragm 14 a single staple 20 is mounted midway between the various radial members 13. The staples 20 are all identical, and they may be tapered internally in a longitudinal direction in order to receive tapered locking pins or wedges 21 for a purpose presently to be described.

The gas cleaning elements of the present invention comprise, first, a plurality of flat segmental diaphragm plates 23 having spaced linear rows of perforations 24 and slots or notches 25 in or adjacent the marginal edge which fit over and straddle all of the staples 20 when said plates 23 are seated on and supported by the ledge 12, the central diaphragms 14 and the flanges 17 and 18; and, secondly, a plurality of segmental baffle grids 27 which are adapted to be superimposed upon the perforated plates 23 and are constructed in a manner which will now be described.

The segmental baffle grids 27 each comprise a plurality of spaced upstanding bars 28 having lateral tabs 29 projecting alternately from opposite sides thereof, and a spacer rod 30 which is welded to the under sides of the bars 28 adjacent the marginal edges thereof and thus joins the bars together into a rigid unitary baffle grid. The baffle grids 27 have the same segmental contour as the perforated plates 23; and the bars 28 and their staggered lateral tabs 29 are so positioned and arranged that when any baffle grid 27 is superimposed upon any perforated plate 23, the lateral tabs 29 of the baffle grid will lie directly above the perforations 24 of the plate and will be spaced vertically therefrom by the marginal spacer rod 30, as illustrated in Figs. 3 and 4, so that gases ascending through the perforations 24 will be deflected and the scrubbing action increased, as will be readily understood by anyone skilled in the art.

Although the baffle grids 27 have the same segmental contour as the perforated plates 23, the overall area of the baffle grids is smaller and corresponds with the perforated area of the plates. Hence, when a baffle grid 27 is properly superimposed upon a plate 23, the entire marginal edge of plate 23 containing the slots 25 will extend out beyond the marginal edge of the overlying grid 27, as illustrated in Fig. 1.

For the purpose of securing the baffle grids 27 in place in the gas scrubbing apparatus, a plurality of U-shaped ears or tabs 32 are welded to the spacer rods 30, these ears 32 projecting outwardly from the marginal edge of the baffle grid and being spaced so that they will mate only with alternate staples 20 on the ledge 12 and the flanges 17 and 18 of radial members 13, as well as with the individual staples 20 on the central diaphragm 14.

In assembling the gas cleaning element in the cleaning zone of the apparatus shown in Fig. 1, the perforated plates 23 are first placed in position on the support comprising the ledge 12, the flanges 17 and 18, and the central diaphragm 14, with all of the marginal slots 25 of said plates straddling the staples 20, as previously described. Wedges 21 are then inserted through alternate staples 20 and driven into place to secure the plates in position. Every other staple is skipped or left empty, including, preferably, the end or corner staple of each file and the staples on the central diaphragm 14. The staples which are thus skipped or left unoccupied in mounting the perforated plates 23 are those whose positions correspond with the positions of the U-shaped ears or tabs 32 projecting from the marginal edges of the baffle grids 27.

The said baffle grids 27 are next superimposed upon the respective perforated plates 23 so that the projecting ears 32 of the baffle grids straddle the unoccupied alternate staples 20 on the ledge 12, the flanges 17 and 18, and the central diaphragm 14, which unoccupied staples project unobstructedly through the marginal slots 25 of the perforated plates 23. Wedges 21 are then inserted through these previously unoccupied staples 20 and are driven into place so that they span both prongs of the ears 32 and thus not only secure the baffle grids 27 in position, but also tightly clamp the latter and the perforated plates 23 together upon the supporting structure with the baffles properly aligned with the perforations and spaced above the same as shown in Figs. 1 to 4.

Figs. 5 and 6 illustrate a modification of the invention in which the staples 20 are secured as by welding to the perforated plate 23 and to projecting ears 34 welded to the spacer rod 30 of baffle grid 27. The ledge 12, the flanges 17 and 18, and the central diaphragm 14 are all provided with slots 35 (in the positions occupied by the staples 20 in Figs. 1 to 4) to receive the staples 20 in Figs. 5 and 6, and the perforated plate 23 is provided adjacent its marginal edge with slots 36 registering with alternate slots 35 to permit passage of the staples 20 carried by the superimposed baffle grid 27. The wedges 21 are driven between the staples 20 and the underside of the respective supports 12, 14, 17 and 18 to lock the parts securely together.

In the further modification shown in Fig. 7 the perforated plate 23 and the baffle grid 27 are secured to the under surfaces of the supporting members 12, 14, 17 and 18. The baffle grid 27 is secured in position first, after which the perforated plate 23 is secured beneath the baffle grid with the staples 20 of the perforated plate projecting upwardly through slots 37 in the ears 32 of the baffle grid and the alternate slots 35 in the supporting member. In this embodiment of the invention the wedges 21 are driven between the staples 20 and the upper side of the respective supports 12, 14, 17 and 18. A packing strip 34 may be positioned between the plate 23 and the flange 18 to prevent passage of gases except through the perforations 24.

It is to be noted that in all of the above embodiments the staples and ears serve to align the baffle grids accurately with respect to the perforated plates and that the marginal spacer rods 30 serve to space the baffles from the perforated plate. In the embodiment of Fig. 6 the supporting means is entirely above the perforated plates so that their under surfaces are smooth and unobstructed to a transverse spray.

Although certain specific embodiments of the invention have been shown for purposes of illustration, it is to be understood that the invention is capable of various uses and that changes and modifications may be made therein as will be readily apparent to a person skilled in the art. The invention is only to be limited in accordance with the scope of the following claims.

What is claimed is:

1. A diaphragm assembly for a gas and liquid contact apparatus, comprising a perforated plate having marginal slots for securing said plate to a support, and a baffle grid adapted to be superimposed upon said perforated plate and having a spacer on the engaging surface thereof for spacing said plates apart, and slotted ears extending outwardly from said spacer for securing said baffle plate to a support.

2. A diaphragm assembly for a gas and liquid contact apparatus, comprising a perforated plate having marginal slots and a baffle grid adapted to be superimposed upon said diaphragm plate and having a marginal spacer rod on the engaging surface thereof for spacing said grid from said plate, slotted ears extending outwardly from said spacer rod to register with said first slots, and means extending through said slots for securing said plate and grid to a support.

3. A diaphragm assembly for a gas and liquid contact apparatus, comprising a perforated plate having marginal slots and a baffle grid adapted to be superimposed upon said diaphragm plate and having a marginal spacer rod on the engaging surface thereof for spacing said grid from said plate, slotted ears extending outwardly from said spacer rod to register with said first slots, loops extending through said slots, and wedge blocks in said loops for securing said plate and grid to a support.

4. In a gas and liquid contact apparatus, a casing, a support in said casing including a central imperforate diaphragm and radial members supporting said diaphragm and extending between said diaphragm and said casing, perforated plates on said support, baffle grids overlying said perforated plates, spaced aligned securing means on said perforated plate and said baffle grid and removable means engaging said securing means to secure said plate and grid to said support.

5. In a gas and liquid contact apparatus, a casing, a support in said casing including a central imperforate diaphragm and radial members supporting said diaphragm and extending between said diaphragm and said casing, perforated plates on said support, baffle grids overlying said perforated plates, marginal members on said plate and grid having aligned slots, and means including loops and wedge blocks extending through said slots to position and secure said plate and grid to said support.

6. In a gas and liquid contact apparatus, a casing, internal supporting flanges carried by said casing, a plurality of staples secured to said flanges, perforated plates mounted on said flanges and containing slots adjacent the marginal edges thereof straddling said staples, tapered locking pins wedged into certain of said staples against said perforated plates and clamping the latter in position, baffle grids having marginal spacer rods on the engaging surface thereof superimposed upon said perforated plates and spacing said baffle grids slightly from said perforated plates, slotted ears extending outwardly from said spacer rods and straddling other different staples unoccupied by the aforementioned locking pins, and tapered locking pins wedged into said other staples against said slotted ears and clamping said baffle grids and plates in position, said last pins being adapted to be removed to release said grids without releasing said plates.

ROBERT R. HARMON.

REFERENCES CITED

The following references are of record in the file of this patent:

UNITED STATES PATENTS

| Number | Name | Date |
| --- | --- | --- |
| 2,136,139 | Kuhni | Nov. 8, 1938 |
| 2,194,126 | Schwandt | Mar. 19, 1940 |

FOREIGN PATENTS

| Number | Country | Date |
| --- | --- | --- |
| 370,524 | German | Mar. 3, 1923 |